United States Patent Office 2,930,769
Patented Mar. 29, 1960

2,930,769

PROCESS OF FOAMING A SATURATED POLYESTER USING A DICARBOXYLIC ACID DIAZIDE AS THE BLOWING AGENT AND PRODUCT OBTAINED THEREBY

Geoffrey A. Haggis and Arthur Lambert, Manchester, England, assignors to Imperial Chemical Industries Limited, London, England, a corporation of Great Britain No Drawing. Application November 27, 1956
Serial No. 624,544

Claims priority, application Great Britain
November 30, 1955

3 Claims. (Cl. 260—2.5)

This invention relates to foamed materials and more particularly it relates to solid foamed materials derived from polymeric materials containing hydroxyl or amino groups.

We have found that solid foamed materials of low density may be obtained by heating a mixture of certain polymeric materials and a dicarboxylic diazide to the foaming temperature when simultaneous blowing and curing take place.

According to the invention we provide a process for the manufacture of solid foamed materials which comprises mixing a polymeric material containing hydroxyl or amino groups which is of comparatively low molecular weight and is in the liquid state with a dicarboxylic acid diazide and then heating the mixture thereby produced to the foaming temperature.

It is preferred that the diazide should be dissolved or finely dispersed in the polymeric material. This may be achieved by dissolving the diazide in a suitable solvent, for example methylene dichloride, blending the resulting solution with the polymeric material and then removing the solvent in vacuo.

As suitable dicarboxylic acid diazides there may be mentioned for example isophthalic acid diazide, terephthalic acid diazide, 5-tertiarybutylisophthalic acid diazide, 5-nitro-isophthalic diazide, and pyridine-2:5-dicarboxylic acid diazide. We prefer to use 5-tertiarybutylisophthalic acid diazide as it is much less sensitive to friction and to heat than related dicarboxylic acid diazides for example isophthalic acid diazide and terephthalic acid diazide. 5-nitroisophthalic diazide is also considerably less sensitive to friction than most diazides but imparts a yellow colour to the sponge.

As suitable polymeric materials containing hydroxyl or amino groups and of comparatively low molecular weight there may be mentioned for example polyester and polyester amide materials for example substantially linear polyester materials. A suitable polyester material containing hydroxyl groups may be obtained for example by heating a mixture of adipic acid, diethylene glycol and penta-erythritol in an inert atmosphere for example in an atmosphere of carbon dioxide. The said polymeric materials have a sufficiently high viscosity for example a viscosity of about 2000 poises at 25° C. to prevent escape of nitrogen otherwise it is found that comparatively little foaming takes place.

The foaming temperatures used in the process of manufacture is dependent on the decomposition temperature of the particular dicarboxylic acid diazide used and the said foaming temperature is usually between about 50° C. and about 100° C.

The process of manufacture may optionally be carried out in the presence of a basic catalyst for example bis(diethylaminoethyl)adipate.

The dicarboxylic acid diazide used as starting material may be obtained by any process known to the art for example from the corresponding dicarboxylic acid dihydrazide by reaction with nitrous acid obtained for example from a metallic nitrite for example sodium nitrite in an acid medium for example in a medium of hydrochloric acid, at a reasonably low temperature for example at a temperature of about 0° C. to about 5° C.

The dicarboxylic acid dihydrazide itself may be obtained by heating together the corresponding dicarboxylic acid ester and hydrazine hydrate in the presence of an inert diluent or solvent for example methanol.

The 5-tertiary-butylisophthalic acid diazide used as starting material is a new compound.

Thus according to a further feature of the invention we provide the new compound 5-tertiary-butylisophthalic acid diazide.

As stated above, the products of the invention are solid foamed materials of low density and since foaming in the process of manufacture does not commence until the necessary foaming temperature is reached, the process of manufacture is especially valuable when the foamed materials are used in moulding operations. Furthermore, products made by the process of our invention give better resistance to discolouration on exposure to light than products made from polyester, polyisocyanate and water.

The invention is illustrated but not limited by the following examples in which the parts are by weight:

*Example 1*

A mixture of 14.8 parts of a polyester containing hydroxy groups, 3 parts of 5-tertiary-butylisophthalic acid diazide and 0.5 part of bis(diethylaminoethyl)adipate is heated at 90° C. during 30 minutes. The product so obtained is a colourless sponge-like material which has a specific gravity of about 0.05.

The polyester containing hydroxyl groups used as starting material may be obtained by passing a stream of carbon dioxide through a stirred mixture of 1898 parts of adipic acid, 1410 parts of diethylene glycol and 136 parts of pentaerythritol at 170° C., while the temperature is raised to 250° C. during 4.5 hours. After stirring at 250° C. for a further 4.5 hours, the amount of water collected amounts to 470 parts and the residue is a viscous syrup of a polyester containing hydroxyl groups. The said polyester has a melt viscosity of 2160 poises at 25° C.

The 5-tertiary-butylisophthalic acid diazide used as starting material may be obtained by heating a mixture of 40 parts of dimethyl 5-tertiary-butylisophthalate, 40 parts of 60% aqueous hydrazine hydrate solution and 64 parts of methanol under reflux during 16 hours. The bulk of the methanol is removed by distillation and the residue solution is cooled and filtered. The solid residue so obtained is 5-tertiary-butylisophthalic acid dihydrazide, M.P. 198–200° C. A solution of 38 parts of this dihydrazide in 305 parts of N aqueous hydrochloric acid is cooled to 0° C. and treated with a solution of 21 parts of sodium nitrite in 50 parts of water. The mixture is filtered and the solid residue is dried in vacuo at about 20° C. and is then crystallised from aqueous acetone. There is thus obtained 5-tertiary-butyl-isophthalic acid diazide, M.P. 99–100° C.

*Example 2*

A solution of 8.4 parts of 5-nitroisophthalic diazide in 75 parts of methylene dichloride is mixed with 45 parts of the polyester used in the procedure of Example 1. The methylene dichloride is then removed by placing the solution under vacuum at room temperature and the resulting dispersion of the azide in the polyester is heated at 95° C. for 30 minutes. The product is a yellow cellular material with a specific gravity of about 0.05. 5-nitroisophthalic diazide may be prepared as follows:

An intimate mixture of 54 parts of 5-nitro-isophthalic acid and 135 parts of phosphorus pentachloride is heated at 100° C. until completely liquid. The phosphorus oxychloride produced is distilled off in vacuo and the residue is crystallised from light petroleum ether to give 50 parts of the acid chloride, M.P. 68–70° C. A solution of 50 parts of the acid chloride in 160 parts of acetone is added gradually to a stirred solution of 32 parts of sodium azide in 200 parts of water, the temperature being held below 20° C. by external cooling. The mixture is filtered and the solid is washed and dried to give 49.7 parts of 5-nitro-isophthalic diazide, M.P. 101–2° C. It may be crystallised from acetone, and then melts at 106–7° C.

*Example 3*

A mixture of 14 parts of the polyester used in the procedure of Example 1, 2.7 parts of 4-chloro-isophthalic diazide and 0.5 part of bis-(diethylaminoethyl)adipate is heated at 90° C. during 30 minutes. The product is a colourless cellular material of specific gravity about 0.05. 4-chloroisophthalic diazide may be prepared as follows:

A mixture of 44 parts of 4-chloroisophthalic acid, 350 parts of thionyl chloride and 0.5 part of pyridine is heated under reflux, till a clear solution is obtained, and then excess thionyl chloride is distilled off. The residue is distilled in vacuo to give 41 parts of 4-chloroisophthalic acid chloride (B.P. 159–160° C./15 mm.). A solution of 12 parts of the acid chloride in 40 parts of acetone is added to a stirred solution of 8 parts of azide in 50 parts of water at a temperature below 20° C. The mixture is filtered, and the solid is washed and dried, to give 12.5 parts of 4-chloro-isophthalic diazide, M.P. 70° C. The product may be crystallised from acetone, whereby the melting point is raised to 72–3° C.

*Example 4*

504 parts of a polyester prepared from adipic acid, diethylene glycol and pentaerythritol, and having a melt viscosity of 170 poises at 25° C. is reacted with 23.4 parts of 2:4-toluylene diisocyanate (this amount being equivalent to 45% of the hydroxyl and carboxyl end groups present) by heating for 16 hours at 90° C., whereby the viscosity is increased to 13,000 poises at 25° C. 32 parts of this product are then blended with a solution of 2.7 parts of isophthalic diazide in 30 parts of methylene dichloride. The solvent is then removed in vacuo leaving a solution of the azide in the polyester. A mixture of 15 parts of this solution with 0.3 part of bis-(diethylaminoethyl)adipate is heated at 95° C. for 30 minutes. The resulting cellular material is colourless and fine-textured, and has a specific gravity of about 0.06.

*Example 5*

70 parts of a polyesteramide prepared from diethylene glycol, pentaerythritol, ethanolamine and adipic acid, and having a viscosity of 92 poises at 25° C., is modified by heating for 16 hours at 90° C. with 4.7 parts of 2:4-toluylene diisocyanate (equivalent to 55% of the hydroxyl and carboxyl groups present). The product is blended with a solution of 7 parts of isophthalic diazide in 50 parts of methylene dichloride, and the solvent removed in vacuo. 15 parts of the blend are mixed with 0.4 part of bis-(diethylaminoethyl)adipate and heated for 30 minutes at 95° C. There results a colourless cellular material having a specific gravity of about 0.08.

What we claim is:

1. Process for the manufacture of solid foamed materials which comprises mixing a saturated synthetic condensation polymer which is a polyester derived by condensation reaction between a saturated dicarboxylic acid and saturated polyhydric alcohol with a dicarboxylic acid diazide and then heating the mixture thereby produced to a temperature in the range of 50° to 100° C.

2. Process for the manufacture of solid foamed materials as claimed in claim 1 wherein the dicarboxylic acid diazide is 5-tertiarybutylisophthalic acid diazide.

3. Solid foamed materials prepared by the process of claim 1.

References Cited in the file of this patent

UNITED STATES PATENTS

| | | |
|---|---|---|
| 2,518,249 | Ott | Aug. 8, 1950 |
| 2,532,240 | Ott | Nov. 28, 1950 |
| 2,532,241 | Ott | Nov. 28, 1950 |
| 2,769,819 | Sommers et al. | Nov. 6, 1956 |